United States Patent [19]

Marans et al.

[11] 4,169,175

[45] Sep. 25, 1979

[54] REMOVAL OF UNREACTED TOLYLENE DIISOCYANATE FROM URETHANE PREPOLYMERS

[75] Inventors: Nelson S. Marans; Alfred Gluecksmann, both of Silver Spring, Md.

[73] Assignee: W. R. Grace & Co., New York, N.Y.

[21] Appl. No.: 841,247

[22] Filed: Oct. 11, 1977

Related U.S. Application Data

[63] Continuation-in-part of Ser. No. 695,344, Jun. 14, 1976, Pat. No. 4,061,662, which is a continuation-in-part of Ser. No. 608,498, Aug. 28, 1975, abandoned.

[51] Int. Cl.$^2$ .............................................. C08G 18/70
[52] U.S. Cl. ...................................... 528/59; 528/60; 528/66

[58] Field of Search ............... 260/77.5 AA, 77.5 AM, 260/77.5 AP, 75 TN, 75 NP, 75 NE; 528/59, 60, 66

[56] References Cited

U.S. PATENT DOCUMENTS

| | | | |
|---|---|---|---|
| 3,415,790 | 12/1968 | Davis et al. | 264/184 |
| 3,878,157 | 4/1975 | Olstowski et al. | 260/77.5 AP |

*Primary Examiner*—Maurice J. Welsh
*Attorney, Agent, or Firm*—Richard P. Plunkett; Philip M. Pippenger; William W. McDowell, Jr.

[57] ABSTRACT

Disclosed herein are improved urethane prepolymers comprising the reaction product of a polyol with a monomeric isocyanate. The amount of residual unreacted monomeric isocyanate in said prepolymer is less than about 0.7% by weight of said prepolymer.

20 Claims, No Drawings

4,169,175

REMOVAL OF UNREACTED TOLYLENE DIISOCYANATE FROM URETHANE PREPOLYMERS

CROSS-REFERENCE TO RELATED APPLICATIONS

This application is a continuation-in-part of co-pending application Ser. No. 695,344, filed June 14, 1976 now U.S. Pat. No. 4,061,662, which in turn is a continuation-in-part of application Ser. No. 608,498, filed Aug. 28, 1975 (now abandoned).

BACKGROUND OF THE INVENTION

(1) Prior Art

In the process of the preparation of polyisocyanates (e.g. urethane prepolymers) which are used in conjunction with water in the production of polyurethane foams, polyoxyethylene polyols are generally end capped with monomeric isocyanates.

One of the monomeric isocyanates extensively used industrially in said end capping reaction is tolylene diisocyanate hereinafter referred to as TDI. TDI, as isocyanates in general, has been known for its physiologically detrimental effects and although generally only 2-3% by weight of free TDI is present in the polyoxyethylene polyol-TDI reaction product, which is used in foam manufacturing industry, it is sufficient to constitute a serious hazard to production line workers who are exposed to large volumes of the volatile isocyanate for prolonged periods of time.

Recent OSHA regulations have reduced the amount of free TDI permitted in the air from 0.02 p.p.m. to 0.005 ppm.

The prior art relating to means of removing residual free TDI from polyoxyethylene polyol-TDI reaction product is scarce which is attributable to the fact that only recently has a consciousness developed with regards to the deleterious effects of the presence of relatively minute quantities of unreacted TDI in said reaction product.

Nevertheless a number of expedients have been proposed in the past for rendering the isocyanates, and particularly volatile diisocyanates, utilizable. In particular, it has been proposed to react volatile di-functional isocyanates (having the general formula $R-[NCO]_2$) with polyfunctional alcohols (having the general formula $X(OH_n)$), in a ratio $-NCOeq/-OHeq$ of about 2:1.

Theoretically, that reaction should result in the production of a high molecular weight (and consequently essentially non-volatile) polyisocyanate containing as many —NCO isocyanate groups as there are hydroxyl groups contained in the polyalcohol, i.e. in the production of products of the type:

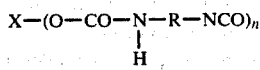

However, in practice, that result is not obtained. Using the aforesaid ratio, there still remain, in the final product, hazardous unreacted amounts of the starting volatile di-functional isocyanate and there are present compounds having a higher molecular weight than the theoretical molecular weight and which derive from the reaction of all the isocyanate groups of the same molecule of the same starting volatile difunctional isocyanate.

It is possible, by using $-NCOeq/-OHeq$ ratios higher than 2:1, to reduce the formation of high molecular weight condensates. However, when such ratios are used, the amount of unreacted volatile diisocyanate contained in the reaction product is increased.

On the other hand, when $-NCOeq/-OHeq$ ratios lower than 2:1 are used, the amount of unreacted volatile diisocyanate in the reaction product is reduced, but the content of high molecular weight condensates is increased.

According to the prior art, it is, in general, preferred to use $-NCOeq/-OHeq$ ratios around 2:1 and to then remove the unreacted volatile isocyanate by chemical or physical means.

According to one prior art method, the unreacted volatile isocyanate is removed from the crude (total) reaction product by rapid distillation under vacuum. That procedure involves a number of drawbacks since, in order to insure a rapid distillation, it is necessary to operate at temperatures that give collateral reactions which (by reaction between isocyanic and urethane groups) result in the formation of allophanic acid esters and polymers having an isocyanate structure. The result is that the finished product obtained by that process is (as compared to the crude reaction product) strongly yellowed, more viscous, and has a higher molecular weight and a lower content of isocyanic group.

According to another prior art method, the crude (total) product of the reaction between the isocyanate and polyfunctional alcohol is treated with an aliphatic or cycloaliphatic hydrocarbon which is a selective solvent for the unreacted volatile diisocyanate. The treatment with the selective aliphatic or cycloaliphatic hydrocarbon must be carried out at a starting temperature of at least 80° C. and at a final temperature of about 130° C. to prevent precipitation of the high molecular weight polyisocyanate during extraction of the unreacted volatile isocyanate. Owing to the temperatures used, that procedure involves the same drawbacks as those mentioned previously.

According to another prior art method, the unreacted volatile diisocyanate is extracted from a solution of the crude (total) reaction product, in a solvent such as, for example, acetic acid esters, alkyl carbonates, ketones, chlorinated hydrocarbons which are, in general, the same as the solvents used as the liquid reaction medium, with mixtures of those solvents of the crude reaction product and aliphatic or cycloaliphatic hydrocarbons. The high molecular weight polyisocyanate is only slightly soluble in the aliphatic or cycloaliphatic hydrocarbons which show an affinity for both the unreacted volatile isocyanate and the solvents for the crude reaction product, so that, using this method it is possible to carry out the extraction of the unreacted volatile isocyanate at temperatures which avoid the collateral reactions mentioned hereinabove.

However, this last mentioned method is not free from technological difficulties. In practice, the mixture of solvents used for the extraction of the unreacted isocyanate from the crude reaction product must be selected in dependence on the nature of the polyisocyanate and used in a particular ratio of the solvent for the particular crude reaction product to the aliphatic or cycloaliphatic hydrocarbon which ratio must be maintained constant throughout the extraction. For example, if an excess of the solvent for the crude reaction product is used, there is a significant loss of high molecular weight polyisocyanate during the extraction, while use of an excess of the aliphatic or cycloaliphatic hydrocarbon results in the precipitation of the high molecular weight polyisocyanate in the form of crystals which obstruct and block the extraction apparatus.

Most recently a process for the obtention of a high molecular weight polyisocyanate has been disclosed in U.S. Pat. No. 3,883,577 where the reaction between the volatile diisocyanate and an active hydrogen containing compound is carried out in a solvent medium which has a strong affinity for the reaction product (high molecular weight polyisocyanate) but is only partly miscible with the hydrocarbon used as solvent for the extraction of the unreacted volatile diisocyanate and facilitates separation of the diisocyanate by being easily distillable without causing collateral reactions.

It may thus seem that the prior art has dealt with the problem of removal of unreacted TDI from polyisocyanates by primarily concentrating on either stoichiometric adjustments or solvent extraction, both methods having as main drawbacks the inherent undesirable effect on the reaction products' molecular weight (and on crosslink density).

DESCRIPTION OF THE INVENTION

The invention is an improved polyisocyanate (i.e. urethane prepolymer) comprising the reaction product of a polyol with a monomeric aliphatic or aromatic isocyanate. The amount of residual unreacted monomeric isocyanate in said prepolymer is less than about 0.7% by weight of said prepolymer. Preferably, the residual isocyanate content is less than about 0.5%.

The improved prepolymer is prepared by allowing said prepolymer to flow through a mildly heated column packed with an absorbent molecular sieve (e.g. commercially available X-type zeolites) wherein free monomeric isocyanate is preferentially absorbed.

The polyurethane foam industry uses high molecular weight polyisocyanates as their so-called "prepolymers" in the preparation of their foams. Polyisocyanate prepolymers are generally the reaction product of monomeric isocyanates and polyols and specifically, as related to the present invention, of a mixture of 2,4 and 2,6 tolylenediisocyanate and polyethylene glycol. When these reactants are mixed at stoichiometric amounts, i.e. 2.0 equivalents —NCO/1.0 equivalents —OH often in presence of a crosslinking agent such as trimethylolpropane and/or a catalyst and are heated, the following reaction presumably takes place:

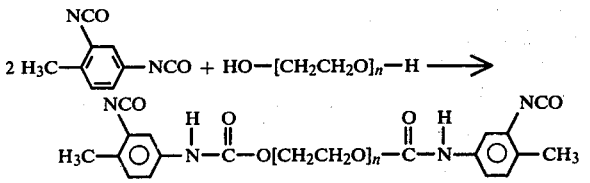

i.e. through polyurethane linkage formation a high molecular weight polyisocyanate is formed.

This "prepolymer" is later reacted with $H_2O$ through its —NCO functionality whereby $CO_2$ is formed; with the resulting —$NH_2$ group reacting with another —NCO group so that a urea linkage is established; thus the foam is formed.

The scope of this invention however is restricted to the high molecular polyisocyanate at its "prepolymer" stage. At that stage it is shipped to the foam manufacturing plants for eventual foaming. It is thus handled at a not necessarily strictly chemically oriented industrial environment by large numbers of workers in large volumes for prolonged periods of time. The content of previously discussed toxic TDI ranges at that stage from 2 to 3% a level which must be reduced for compliance with OSHA regulations which now restrict the maximum amount of free TDI in air to 0.005 ppm.

It has been known for some time that certain zeolites both naturally occuring and synthetic, have the property of separating organic compound molecules as a function of their molecular weight and/or atomic configuration. Reference to that effect is made to an article appearing in Quarterly Reviews, Vol. III, pp. 293–330 (1949), titled "Molecular Sieve Action of Solids" and published by the Chemical Society (London).

These zeolites have crystalline structures containing a large number of small cavities interconnected by a number of still smaller holes or pores, the latter being of exceptional uniformity of size. Only molecules small enough to enter the pores can be absorbed, although not all molecules even though small enough to enter the pores, will be absorbed. An affinity of the molecule for the absorbent must be present. The pores may vary in diameter from 3–5 Angstrom units to 12–15 or more but it is a property of these zeolites, or molecular sieves, that for a particular sieve the pores are of substantially uniform size. Thus, in a program designed to minimize the unreacted TDI content in the high molecular weight polyisocyanate, it was discovered that when said polyisocyanate or prepolymer was contacted with a specific molecular sieve, the unreacted TDI content was drastically reduced, i.e. by amounts ranging from 50 to 99% of the original unreacted TDI.

More specifically, the high molecular weight polyisocyanate was allowed to flow through a heated column packed with an X-type zeolite with a pore size of 6–8Å and having a ratio of $Na_2O/Al_2O_3/SiO_2$ of 1.0/1.0/2.5; a crystalline powder with a distinctive X-ray diffraction pattern commercially available in quantity. The effluent was analyzed for free TDI content and it was noted that a reduction of TDI content in the order of 67% had occured, without an accompanying change in the polymer's viscosity.

Although in the present invention a column has been employed, other geometries may be used for treatment as for example adding the molecular sieves to polyisocyanate batch and then removing said sieves by filtration or centrifugation. Also, before treatment with the molecular sieves the polyisocyanate may be slightly heated to decrease its viscosity hence decreasing its dwell time in the column.

Desorption of the material from the molecular sieves may be brought about by purging first with a suitable solvent e.g. anhydrous acetone to remove any residual polyisocyanate and then with a suitable inert gas followed by reactivation heating.

Although in the present invention TDI was used as the aryl isocyanate, trimethylolpropane as the crosslinking trihydric alcohol, and polyethylene glycol as the polyoxyalkylene polyol these compounds are in no way intended to be limiting. The principles involved in the novel method of removing unreacted monomeric isocyanate from a polyisocyanate apply as well to polyisocyanates which are the reaction product of a wide variety of monomeric isocyanates, trihydric alcohols, and polyoxyalkylene polyols some of which are enumerated below.

Due to the difference in molecular dimensions of monomeric isocyanates commonly employed in preparing urethane prepolymers, the X-type zeolite employed in purifying the prepolymer will vary. However, the approximate molecular dimensions of monomeric isocyanates are well-known or readily ascertainable. The absorbent characteristics of zeolites are also well-known. Therefore, it would be apparent to one skilled in formulating prepolymers to match the molecular dimensions of the monomeric isocyanate with the X-type zeolite having the appropriate absorbent capacity so that free monomeric isocyanate will be entrapped or absorbed into the zeolite and thereby separated from the prepolymer. The uniqueness of the invention lies partly in the discovery that X-type zeolites have unexpectedly high binding capacity for monomeric isocyanates which enables the relatively pure prepolymer to be produced.

The urethane prepolymer can contain either polyether or polyester polyols as backbone segments. These segments are capped with an aromatic or aliphatic isocyanate containing 2 or 3 NCO groups per mole. Suitable capping techniques to provide prepolymers having at least 2 NCO groups/mole are well-known to those employed in formulating such prepolymers. Suitable aromatic isocyanates (e.g. toluene diisocyanate or bis(4-isocyanatophenyl)methane) are set forth below. Suitable polyether prepolymers include, for example, the polyalkylene oxide ethers, such as the reaction products of ethylene oxide, propylene oxide, butylene oxide, styrene oxide, picoline oxide or methyl glycoside, with a compound containing two or more reactive hydrogens, such as water, resorcinol, glycerol, trimethylol propane, pentaerythritol, ethylene glycol diethylene glycol, triethylene glycol, and the like. The polyethers are further exemplified by compounds such as polyoxypropylene glycol, polyoxyethylene glycol, polyoxybutylene glycol, polyoxyethyleneoxypropylene glycol, polyoxyethyleneoxybutylene glycol and polyoxypropyleneoxybutylene glycol.

Preferably, the polyether urethane prepolymers employed are hydrophilic, i.e. at least 40 mole % of the oxyalkylene units in the prepolymer backbone are oxyethylene units with the balance being oxypropylene, oxybutylene or other oxyalkylene units. In the resulting polyurethane foams, the branch-points of the polymer chains are connected by essentially linear polyoxyalkylene chains containing at least 40 mole % of oxyethylene units (excluding initiators at branch-points) as described above. Preferably, the oxyethylene content is at least 60, or even 75 mole %.

Suitable prepolymers are prepared by capping the polyol (e.g. polyether) with an excess of monomeric isocyanate, e.g. toluene diisocyanate. Prior to capping, the polyol should have a molecular weight of from about 200 to about 20,000 and preferably from about 600 to about 6,000. The hydroxy functionality of the polyol and the corresponding isocyanate functionality following capping is from 2 to about 8. If foams are formed from prepolymers with an isocyanate functionality of about 2, the resulting foam is essentially linear and does not have as much tensile strength as cross-linked foams. Accordingly, if the isocyanate functionality is about 2, a crosslinker can be employed.

Examples of suitable polyols (to be capped with monomeric isocyanates include: (A) essentially linear polyols formed for example by reaction of ethylene oxide with water, ethylene glycol or higher molecular weight glycols as an initiator. As discussed above, mixtures of ethylene oxide with other alkylene oxides can be employed so long as the mole percent of ethylene oxide is at least 40 percent. Also as stated, it may be desirable to use crosslinkers with these systems in which case the crosslinker can be included in the water (along with a dispersing agent where necessary) into which the prepolymer is dispersed. Where the linear polyethers are mixtures of ethylene oxide with, e.g., propylene oxide, the polymer can be either random or a block copolymer and the terminal units can be either oxyethylene or oxypropylene. A second class of polyol (B) includes those with a hydroxyl functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C) linear branched polyfunctional polyols as exemplified in A and B above together with an initiator or crosslinker. A specific example of C is a mixture of polyethylene glycol (m. w. about 1,000) with trimethylolpropane, trimethylolethane, or glycerine. This mixture can be subsequently reacted with an excess of the monomeric isocyanate to provide a prepolymer useful in the invention. Where such polyol mixtures (e.g. polyether mixed with crosslinkers having 3 to 8 —OH/-mole) are employed, the mole ratio of polyol/cross-linker is about 2:1 to about 3:1. Alternatively, the linear or branched polyols (e.g. polyethylene glycol) can be reacted separately with an excess of the isocyanate. The initiator, e.g. trimethylolpropane, can also be separately reacted with the isocyanate. Subsequently, the two capped materials can be combined to form the prepolymer.

Suitable monomeric aromatic isocyanates useful in preparing prepolymers include toluene-2,4-diisocyanate, toluene-2,6-diisocyanate, commercial mixtures of toluene-2,4- and 2,6-diisocyanates, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 4,4'-diisocyanatodiphenylether, 4,6-dimethyl-1,3-phenylenediisocyanate and xylylene diisocyanate.

Suitable monomeric aliphatic isocyanates include isophorone diisocyanate, bis-(4-isocyanatocyclohexyl)methane, bis-(3-methyl,4-isocyanatocyclohexyl)methane, hexamethylene diisocyanate and trimers thereof, the biuret adduct of hexamethylene diisocyanate, commercially available as Desmodur N-100 (Mobay).

Useful prepolymers can also be based on polyester polyols such as, for example, the reaction product of polyfunctional organic carboxylic acids and polyhydric alcohols. Typical polyfunctional organic carboxylic acids which may be employed in producing polyesters useful in carrying out the present invention include, for example, dicarboxylic aliphatic acids such as succinic, adipic, sebacic, azelaic, glutaric, pimelic acids and dicarboxylic aromatic acids such as phthalic acid, terephthalic acid, isophthalic acid and the like. Other polycarboxylic acids that can be employed include the "dimer acids" such as the dimer of linoleic acid. Hydroxyl-containing monocarboxylic acids such as ricinoleic acid may also be employed. Alternatively, the anhydrides of any of these acids can be employed in producing the polyesters. Typical polyhydric alcohols that may be employed in producing polyesters useful in carrying out the present invention include, for example, the monomeric polyhydric alcohols such as glycerol, 1,2,6-hexane triol, ethylene glycol, trimethylolpropane, trimethylolethane, pentaerythritol, propylene glycol, 1,3-butylene glycol, and 1,4-butylene glycol.

Initiators and/or crosslinkers useful in the invention include all of those compounds commonly employed for such purposes, e.g. trimethylolpropane, trimethylolethane, pentaerythritol, triethanolamine, glycerol, sucrose, and condensates of sugars containing up to 8 OH groups/mole. In initiating polymerization, especially of alkylene oxides, difunctional molecules can also be employed, e.g. water, ethylene glycol, propylene glycol, etc.

In preparing prepolymers which can be processed as described above by passage through or contact with X-type zeolites, the amounts of polyol and monomeric isocyanate "employed to cap the polyol" are such that the ratio of NCO eq./OH eq. is from about 1.9 to about 2.3 and preferably is greater than 2, i.e. a slight excess of the isocyanate is employed in the capping reaction.

The following examples, while in no way intended to be limiting, will aid in the understanding of this invention.

EXAMPLE 1

A typical polyisocyanate was prepared by reacting polyethylene glycol and trimethylol propane with tolylene diisocyanate at a temperature of about 50° to 60° C.

After storing the reaction product for at least 24 hours, the residual free tolylene diisocyanate content was determined and ranged from 2.0% to 3.0%.

EXAMPLE 2

Another typical polyisocyanate was prepared by the reaction of polyethylene glycol with tolylene diisocyanate at a temperature of 35° to 50° C. This time heating was continued for several hours at 60° C. The residual free TDI content in the system, depending on time during post reaction heating time at which sample was taken, ranged from 0.8 to 3.0%.

EXAMPLE 3

A column 2.5 cm in diameter and 80.0 cm long was packed with 105 g. of type X molecular sieves which had been dried prior to use for two hours at 700° F. This column was then mounted in a vertical Lundberg furnace, brought to and held at a temperature of 50° C., followed by the addition of 130.0 g. of the polyisocyanate prepared as described in Example 1.

The original unreacted TDI content of said polyisocyanate as determined by solvent extraction and UV absorption spectrometry technique was 2.2%. Four successive fractions of the polyisocyanate which had passed through the column described above had their free TDI content determined by the same technique as that used for the original untreated polyisocyanate and the results were as follows: 0.7%, 1.0%, 1.3%, and 1.0% i.e. 1.0%±0.2, which amounts to an approximate reduction in unreacted TDI content in the order of 55%. The initial viscosity was about 25,000 centipoises at 22° C. and the eluant fractions' viscosities ranged from 25,000 to 40,000 centipoises.

EXAMPLE 4

A similar column as that described in Example 3 was packed with 97.6 g of X-type molecular sieve. The column was mounted in a vertical Lundberg furnace, brought to and held at 70°-75° C. followed by the addition of 111.0 g the polyisocyanate prepared as described in Example 2.

The original unreacted TDI content of said polyisocyanate as determined by solvent extraction and UV absorption spectrometry was 0.9%. Five successive fractions of the polyisocyanate which had passed through the column described previously had their free TDI content determined by the same technique as that used for the original untreated polyisocyanate and the results were as follows: 0.4%, 0.2%, 0.4%, 0.2% i.e. 0.3%±0.1 which amounts to an approximate reduction in TDI content of 67%. No appreciable viscosity change was observed following passage of the polyisocyanate through the heated column.

What is claimed is:

1. A composition comprising an isocyanate capped urethane prepolymer and less than about 0.7% by weight of said prepolymer of residual unreacted monomeric polyisocyanate said composition formed by reacting a polyol with a monomeric polyisocyanate and passing the resultant reaction mixture through a column containing absorbent type X zeolite molecular sieves at a temperature of about 20° to 100° C.

2. A prepolymer as in claim 1 wherein the polyol is a polyoxyalkylene polyol with a molecular weight of from about 200 to about 20,000.

3. A prepolymer as in claim 2 wherein at least 40 mole percent of the oxyalkylene units are oxyethylene.

4. A prepolymer as in claim 2 wherein the polyol is a polyoxyalkylene glycol wherein at least 40 mole percent of the oxyalkylene units are oxyethylene.

5. A prepolymer as in claim 2 wherein the polyol is an admixture of a polyoxyalkylene glycol and a monomeric alcohol containing from 3 to 8 hydroxyl groups/mole.

6. A prepolymer as in claim 5 wherein the mole ratio of glycol/monomeric alcohol is from about 3:1 to about 2:1.

7. A prepolymer as in claim 6 wherein the monomeric alcohol has 3 hydroxyl groups/mole.

8. A prepolymer as in claim 2 wherein the monomeric isocyanate is toluene diisocyanate.

9. A prepolymer as in claim 3 wherein the monomeric isocyanate is toluene diisocyanate.

10. A prepolymer as in claim 4 wherein the monomeric isocyanate is toluene diisocyanate.

11. A prepolymer as in claim 5 wherein the monomeric isocyanate is toluene diisocyanate.

12. A prepolymer as in claim 6 wherein the monomeric isocyanate is toluene diisocyanate.

13. A prepolymer as in claim 7 wherein the monomeric isocyanate is toluene diisocyanate.

14. A prepolymer as in claim 5 wherein the NCO/OH stoichiometric ratio employed in forming the prepolymer is from about 1.9 to about 2.3.

15. A prepolymer as in claim 6 wherein the NCO/OH stoichiometric ratio employed in forming the prepolymer is from about 1.9 to about 2.3.

16. A prepolymer as in claim 7 wherein the NCO/OH stoichiometric ratio employed in forming the prepolymer is from about 1.9 to about 2.3.

17. A prepolymer as in claim 8 wherein the NCO/OH stoichiometric ratio employed in forming the prepolymer is from about 1.9 to about 2.3.

18. A prepolymer as in claim 1 wherein the monomeric isocyanate is xylylene diisocyanate.

19. A prepolymer as in claim 1 wherein the monomeric isocyanate is bis(4-isocyanatophenyl)methane.

20. A prepolymer as in claim 1 wherein the polyol is a polyester polyol having a molecular weight of from about 200 to about 20,000.

* * * * *